(12) United States Patent
Sugiyama et al.

(10) Patent No.: US 11,585,494 B2
(45) Date of Patent: Feb. 21, 2023

(54) FLUORESCENT MODULE AND ILLUMINATION DEVICE

(71) Applicant: NICHIA CORPORATION, Anan (JP)

(72) Inventors: Takafumi Sugiyama, Yoshinogawa (JP); Toshiyuki Hirai, Komatsushima (JP); Masahiko Sano, Anan (JP); Toru Takasone, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/410,847

(22) Filed: Aug. 24, 2021

(65) Prior Publication Data

US 2021/0381662 A1 Dec. 9, 2021

Related U.S. Application Data

(63) Continuation of application No. 16/536,005, filed on Aug. 8, 2019, now Pat. No. 11,131,433.

(30) Foreign Application Priority Data

Aug. 20, 2018 (JP) .............................. JP2018-153977
Oct. 30, 2018 (JP) .............................. JP2018-203634

(51) Int. Cl.
*F21K 9/64* (2016.01)
*F21V 29/505* (2015.01)
(Continued)

(52) U.S. Cl.
CPC .................. *F21K 9/64* (2016.08); *F21V 9/08* (2013.01); *F21V 9/30* (2018.02); *F21V 29/505* (2015.01); *F21Y 2115/30* (2016.08)

(58) Field of Classification Search
CPC .................. F21V 9/64; F21V 9/30; F21V 9/08
See application file for complete search history.

(56) References Cited

U.S. PATENT DOCUMENTS 6,791,259 B1 * 9/2004 Stokes .................... H05B 33/14
313/503
9,506,626 B2 11/2016 Hagemann et al.
(Continued)

FOREIGN PATENT DOCUMENTS

CN 104713035 A 6/2015
JP 2005267927 A 9/2005
(Continued)

OTHER PUBLICATIONS

Restriction Requirement in the related U.S. Appl. No. 16/536,005, dated Oct. 26, 2020.
(Continued)

*Primary Examiner* — Julie A Bannan
(74) *Attorney, Agent, or Firm* — Global IP Counselors, LLP

(57) ABSTRACT

A fluorescent module includes a fluorescent member including a phosphor-containing layer, and a light reflecting layer disposed on the phosphor-containing layer. The phosphor-containing layer contains a YAG phosphor and a Ga-YAG phosphor within the same layer, the Ga-YAG phosphor being a phosphor in which a portion of the aluminum constituting the YAG phosphor is substituted with gallium. A volumetric ratio of the Ga-YAG phosphor to the entirety of the YAG phosphor and the Ga-YAG phosphor is in a range of 19.0% to 80%.

17 Claims, 8 Drawing Sheets

(51) Int. Cl.
*F21V 9/30* (2018.01)
*F21V 9/08* (2018.01)
*F21Y 115/30* (2016.01)

(56) References Cited

U.S. PATENT DOCUMENTS

| | | |
|---|---|---|
| 10,587,090 B1 * | 3/2020 | Raring ............... H01S 5/32341 |
| 2005/0156496 A1 * | 7/2005 | Takashima ......... C09K 11/7734 |
| | | 313/237 |
| 2013/0003347 A1 | 1/2013 | Maemura et al. |
| 2013/0056775 A1 | 3/2013 | Kawakami |
| 2013/0107573 A1 | 5/2013 | Kadomi et al. |
| 2013/0229598 A1 | 9/2013 | Kamada |
| 2014/0204398 A1 | 7/2014 | Sato et al. |
| 2015/0002824 A1 | 1/2015 | Kasugai et al. |
| 2015/0098065 A1 | 4/2015 | Tanaka |
| 2015/0372200 A1 | 12/2015 | Seko et al. |
| 2016/0004147 A1 | 1/2016 | Hu et al. |
| 2016/0138766 A1 | 5/2016 | Owada |
| 2017/0137706 A1 | 5/2017 | Fujita et al. |
| 2017/0219172 A1 | 8/2017 | Inoue et al. |
| 2017/0227176 A1 | 8/2017 | Inoue et al. |
| 2018/0017220 A1 * | 1/2018 | Kitano ....................... F21V 7/04 |
| 2018/0026421 A1 | 1/2018 | Seideiifaden et al. |
| 2018/0287341 A1 | 10/2018 | Lee et al. |
| 2019/0264894 A1 * | 8/2019 | Aketa ...................... F21V 9/38 |

FOREIGN PATENT DOCUMENTS

| | | |
|---|---|---|
| JP | 2007194525 A | 8/2007 |
| JP | 2012-008303 A | 1/2012 |
| JP | 2012-243624 A | 12/2012 |
| JP | 2013-101887 A | 5/2013 |
| JP | 2013-161889 A | 8/2013 |
| JP | 2015-092224 A | 5/2015 |
| JP | 2015-119046 A | 6/2015 |
| JP | 2016-009693 A | 1/2016 |
| JP | 2016-027613 A | 2/2016 |
| JP | 2016-058213 A | 4/2016 |
| JP | 2016-100090 A | 5/2016 |
| JP | 2017-076534 A | 4/2017 |
| JP | 2017-215549 A | 12/2017 |
| JP | 2018-014500 A | 1/2018 |
| JP | 2018-024722 A | 2/2018 |
| JP | 2018-107298 A | 7/2018 |
| JP | 6356522 B2 | 7/2018 |
| JP | 2018-141986 A | 9/2018 |
| WO | 2013190778 A1 | 12/2013 |
| WO | 2018042826 A1 | 3/2018 |
| WO | WO-2018042826 A1 * | 3/2018 ......... C03C 17/3607 |

OTHER PUBLICATIONS

Non Final Office Action in the related U.S. Appl. No. 16/536,005, dated Jan. 27, 2021.
Notice of Allowance in the related U.S. Appl. No. 16/536,005, dated May 26, 2021.

* cited by examiner

FLUORESCENT MODULE AND ILLUMINATION DEVICE

CROSS-REFERENCE TO RELATED APPLICATION

This application is a continuation application of U.S. patent application Ser. No. 16/536,005 filed on Aug. 8, 2019. This application claims priority to Japanese Patent Application No. 2018-153977 filed on Aug. 20, 2018, and Japanese Patent Application No. 2018-203634, filed on Oct. 30, 2018. The entire disclosures of U.S. patent application Ser. No. 16/536,005, Japanese Patent Application Nos. 2018-153977 and 2018-203634 are hereby incorporated herein by reference.

BACKGROUND

The present disclosure relates to a fluorescent module and an illumination device.

There are illumination devices including a combination of a semiconductor laser element and a phosphor-containing member, in which a laser beam is emitted to a phosphor plate comprising a phosphor-containing member disposed on a substrate to obtain white reflected light (for example, see Japanese Unexamined Patent Application Publication No. 2012-243624).

SUMMARY

In such an illumination device, when detachment, breakage, or the like of the phosphor-containing member occurs, the light emitted from the semiconductor laser element may be reflected and emitted to the outside without being wavelength-converted by the phosphor. When the light emitted from the semiconductor laser element is emitted to the outside without undergoing wavelength conversion, eye safety, fire, and the like may be concerned.

According to one embodiment of the present invention, a fluorescent module includes a fluorescent member including a phosphor-containing layer, and a light reflecting layer disposed on the phosphor-containing layer. The phosphor-containing layer contains a YAG phosphor and a Ga-YAG phosphor within the same layer, the Ga-YAG phosphor being a phosphor in which a portion of the aluminum constituting the YAG phosphor is substituted with gallium. A volumetric ratio of the Ga-YAG phosphor to the entirety of the YAG phosphor and the Ga-YAG phosphor is in a range of 19.0% to 80%.

DETAILED DESCRIPTION

Figure 1A:
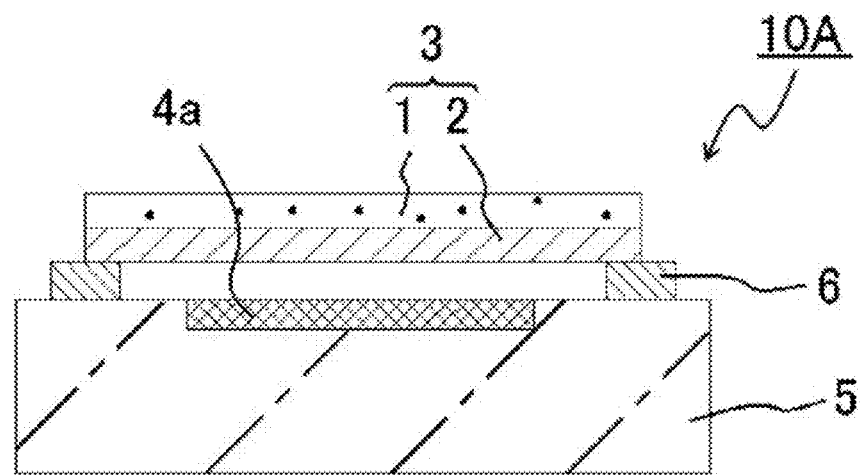
FIG. 1A is a schematic cross-sectional view of a fluorescent module according to embodiments of the present disclosure.

Hereinafter, certain embodiments of the present disclosure will be described with reference to the drawings as appropriate.

A fluorescent module and an illumination device according to certain embodiments will be described below to give a concrete form the technical idea of the present invention, and the present invention is not limited to the embodiments described below unless otherwise specified. The size, the positional relationship and the like of the members shown in the drawings may be exaggerated for clarification of description. The same or like members is are indicated by the same designation and/or the same reference numeral, and the duplicate descriptions thereof may be omitted as appropriate.

First Embodiment: Fluorescent Module 10A

The fluorescent module 10A according to this embodiment includes a fluorescent member 3 that includes a phosphor-containing layer 1 and a light reflecting layer 2, an optical relaxation member that absorbs or diffuses light, and a heat dissipation member 5 to which the fluorescent member 3 is secured. The light reflecting layer 2 is disposed at a position between the phosphor-containing layer 1 and the optical relaxation member, and is sandwiched between the phosphor-containing layer 1 and the heat dissipation member 5.

In this specification, a side of the fluorescent module on which light is irradiated or is incident in various applications of the fluorescent module may be referred to as an "upper surface" or an "upper side" of respective member, and the opposite side of the upper surface or upper side with respect to the phosphor-containing layer 1 may be referred to as a "lower surface" or a "lower side", respectively.

In the fluorescent module 10A shown in FIG. 1A, the optical relaxation member is constituted by a light absorbing member 4a that absorbs light. The light absorbing member 4a is preferably in the form of a layer. While the light absorbing member 4a as shown in FIG. 1A has a single-layer structure and is disposed such that an entirety or a portion of the light absorbing member 4a is located below an upper surface of the heat dissipation member 5, the light absorbing member 4a may be disposed such that an entirety or a portion of the light absorbing member 4a is in contact with the upper surface of the heat dissipation member 5 without being located below the upper surface of the heat dissipation member 5. The light absorbing member 4a may have various thickness according to the material of the light absorbing member 4a, and may have any appropriate thickness which allows for absorbing the laser beam with which it is irradiated, such as 0.4 µm to 1000 µm. The planar shape and the size of the light absorbing member 4a can be adjusted as necessary, according to the spot diameter of the laser beam irradiated to the fluorescent member 3. For example, the light absorbing member 4a has a size same as, or slightly smaller than, a size of the fluorescent member 3. The expression "slightly smaller" as used herein refers to, for example, reduction of 30% or less in size (the same applies hereinafter). In another view, the light absorbing member 4a has a thickness of, for example, about 3 times to 20 times the spot diameter of the laser beam.

The fluorescent member 3 is secured with a bonding member 6 and is connected to the heat dissipation member 5 via the bonding member 6, or may be in contact with the heat dissipation member 5.

The fluorescent module having this configuration is mainly used to convert the wavelength of the laser beam emitted from the laser element, for use in an automotive light sources such as headlights, projector devices, and various kinds of lighting fixture, for example. In use of such a fluorescent module using laser light without defect in the fluorescent member 3, when the laser beam is irradiated from above, substantially an entirety of the light is incident on the fluorescent member 3 as designed. A portion of the incident laser light is wavelength-converted by the phosphor in the phosphor-containing layer, and travels directly to the outside or is reflected by the light reflecting layer. Another portion of the laser light incident on the fluorescent member is reflected by the light reflecting layer without wavelength-converted by the phosphor. This wavelength-converted light and the light that has not undergone wavelength conversion are mixed to be, for example, white light, and emitted to the outside.

Meanwhile, when detachment, breakage, or the like of the fluorescent member occurs, some or an entirety of the laser light may not be incident on the fluorescent member. In this case, the laser light irradiated to the fluorescent member is incident on the optical relaxation member disposed under the fluorescent member. Accordingly, the laser light is not emitted directly to the outside of the device, but is absorbed or diffused in the optical relaxation member, which allows for effectively reducing the amount of laser light. Consequently, the amount of laser light that is released or leaks to the outside can be effectively reduced.

Therefore, when using illumination device for applications such as automotive headlights, projectors, searchlights, household lighting fixtures, store lighting fixtures, office lighting fixtures, outdoor lighting fixtures, etc., even if breakage of the fluorescent member occurs due to vibration, external impact, or the like and in particular the phosphor-containing layer is not irradiated with the laser light, the optical relaxation member can absorb the laser light, and can be used to avoid direct viewing of the laser light.

Second Embodiment: Fluorescent Module 10B

Figure 1B:
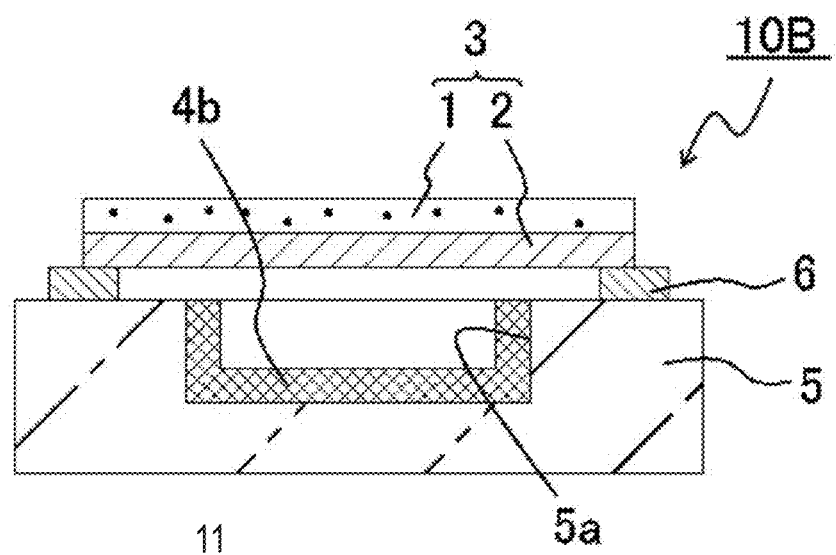
FIG. 1B is a schematic cross-sectional view of a fluorescent module according to a first embodiment of the present disclosure.

As shown in FIG. 1B, the fluorescent module 10B of this embodiment has substantially the same configuration as the fluorescent module 10A, except that the shape of the optical relaxation member that absorbs or diffuses light is different from that in the fluorescent module 10A.

That is, a recess 5a is formed in the upper surface of the heat dissipation member 5, and the optical relaxation member is constituted of a light absorbing member 4b that absorbs light, and is disposed such that, using the recess 5a of the heat dissipation member 5, the optical relaxation member covers the upward-facing surface (lower surface) and the lateral surfaces of the recess 5a. Also, the recess 5a is provided such that the bonding member 6 is disposed outside the recess 5a. Therefore, the region at which the fluorescent member 3 and the heat dissipation member 5 are bonded by the bonding member 6 is located outside the recess 5a, and the fluorescent member 3 is disposed over the recess 5a.

With this configuration, when the fluorescent member 3 is detached, broken, or the like, the laser beam irradiated to the fluorescent member 3 reaches the light absorbing member 4b formed on the bottom or sides of the recess 5a. Accordingly, laser light that has reached the light absorbing member 4b is absorbed by the light absorbing member 4b. Also, when laser light is not absorbed by the light absorbing member 4b, laser light is reflected at a surface of the light absorbing member 4b, and then reaches another portion of the light absorbing member 4b, at which laser light is absorbed by the light absorbing member 4b. Thus, a structure with a recess allows for increasing the opportunity for light absorption, and release or leakage of laser light to the outside can be more effectively reduced. That is, with the recess 5a of the heat dissipation member 5, laser light can be more effectively reduced by the optical relaxation member.

The more the opportunity for absorption of light by the light absorbing member 4b is, the greater effect of absorbing laser light is. Accordingly, the shape and location of the recess 5a are preferably determined so that laser light is incident on the lateral surface of the light absorbing member 4b when the fluorescent member 3 is detached, that is, the fluorescent member 3 is lost from the fluorescent module 10B.

Third Embodiment: Fluorescent Module 10C

Figure 1C:
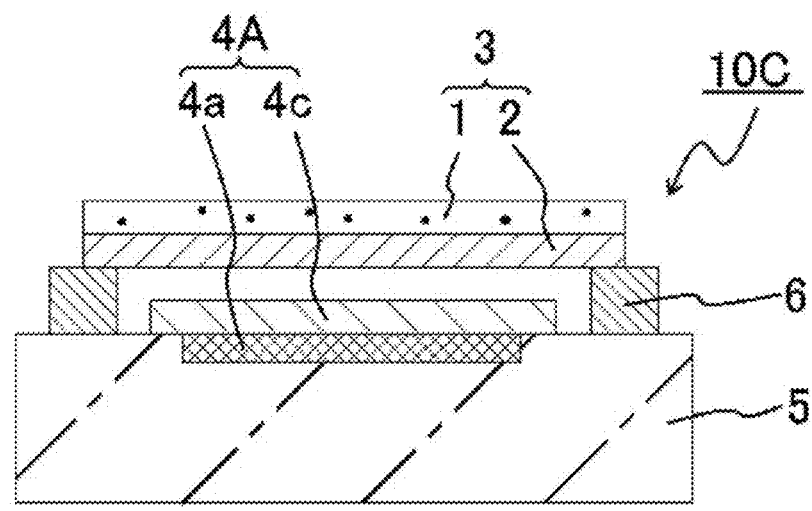
FIG. 1C is a schematic cross-sectional view of a fluorescent module according to a second embodiment of the present disclosure.

As shown in FIG. 1C, the fluorescent module 10C of this embodiment has substantially the same configuration as the fluorescent module 10A, except that an optical relaxation member 4A is constituted of the light absorbing member 4a and a polarization member 4c, so as to allow absorption and/or diffusion of light.

The polarization member 4c is disposed covering a portion of or an entirety of the light absorbing member 4a. The polarization member 4c is disposed in contact with the light absorbing member 4a in FIG. 1C, but the polarization member 4c may instead be disposed such that a portion of or an entirety of the polarization member 4c is spaced apart from the light absorbing member 4a. With a predetermined size of the fluorescent member 3, the smaller the surface area of the polarization member 4c is, the more the bonding surface area between the fluorescent member 3 and the heat dissipation member 5 can be increased, and the greater the heat dissipation of the fluorescent module is. Therefore, it is preferable that the polarization member 4c has a shape and size that are slightly larger than the light absorbing member 4a so that the polarization member 4c is in contact with the heat dissipation member 5 on the outer peripheral portion of the light absorbing member 4a. The term "slightly larger" as used herein refers to, for example, being 30% or less larger in size (the same applies hereinafter).

Laser light is sometimes adjusted so that laser light is incident at a predetermined angle on the fluorescent module to reduce unevenness in color of emitted light, and so on. The oscillation direction of the waves of the laser beam is also adjusted. For example, the laser light incident on the fluorescent member 3 is adjusted to have p polarization and be incident at Brewster's angle, which allows for reducing reflection of laser light at a surface of the fluorescent member 3. Therefore, in the fluorescent module 10C, using incidence of laser light polarized in a predetermined direction on the fluorescent member 3, the polarization member 4c, which transmits only laser light polarized in the predetermined direction, is disposed on the lower side of the phosphor-containing layer 1 in the fluorescent module 10C. For example, when the fluorescent member 3 is detached, incident angle of a laser light of p polarization on the polarization member 4c can be determined, and accordingly, a polarization member 4c which does not transmit laser light of an angle different from the determined incident angle is disposed. With this structure, when detachment, breakage, or the like of the fluorescent member 3 occurs, laser light irradiated to the fluorescent member 3 pass through the polarization member 4c and reach the light absorbing member 4a, so that a large amount of laser light can be absorbed by the light absorbing member 4a. On the other hand, a portion of the laser light that is not absorbed by the light absorbing member 4a may be reflected by a surface of the light absorbing member 4a or a surface of the heat dissipation member 5, and reaches the polarization member 4c. Such laser light, in which polarization direction is changed due to diffusion and/or reflection of laser light, cannot pass through the polarization member 4c, and is instead re-reflected and absorbed by the light absorbing member 4b. This allows for greatly reducing laser light that would otherwise be emitted or leak to the outside.

Fourth Embodiment: Fluorescent Module 10D

Figure 1D:
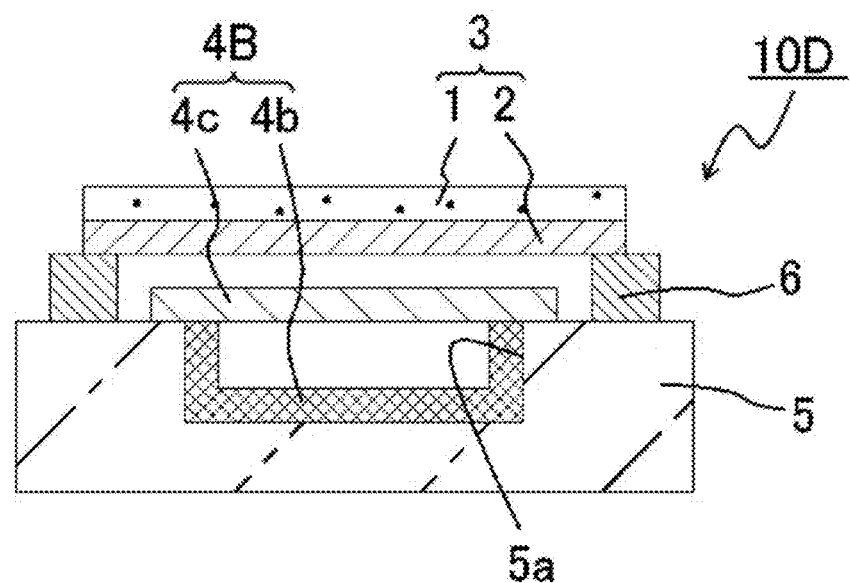
FIG. 1D is a schematic cross-sectional view of a fluorescent module according to a third embodiment of the present disclosure.

As shown in FIG. 1D, the fluorescent module 10D of this embodiment has substantially the same configuration as the fluorescent modules 10B and 10C, except that the optical relaxation member 4B is constituted of the light absorbing member 4b and the polarization member 4c, and the recess 5a is defined in the upper surface of the heat dissipation member 5.

The polarization member 4c is disposed to close or to cover over the recess 5a with a shape and size that are slightly larger than the planar shape of the recess 5a, and a portion of the polarization member 4c is bonded to the heat dissipation member 5. Also, the bonding member 6 is disposed outside the polarization member 4c, and the region bonded to the fluorescent member 3 is also provided outside the polarization member 4c.

It is preferable that the polarization member 4c and the bonding member 6 are not bonded and are not in contact with each other. With the polarization member 4c is bonded to or in contact with the bonding member 6, when detachment, breakage, or the like of the fluorescent member 3 have an influence on the bonding member 6 that bonds the fluorescent member 3 to the heat dissipation member 5, the polarization member 4c may also be subjected to such influence. The light absorbing member 4b is disposed on the upward-facing surface and lateral surfaces of the recess 5a. Therefore, a portion of the polarization member 4c is in contact with the light absorbing member 4b covering the lateral surfaces of the recess 5a.

With the light absorbing member 4b disposed in the recess 5a of the heat dissipation member 5, the light which has passed through the polarization member 4c and reached the recess 5a is more easily reflected in the space defined by the light absorbing member in the recess 5a and the polarization member 4c, and the diffused or reflected light is less likely to pass through the polarization member 4c. This allows for facilitating absorption of light by the light absorbing member 4b, and laser light that would otherwise be emitted or leak to the outside can be effectively reduced.

The fluorescent module describe above includes members as below.

Fluorescent Member 3

The fluorescent member 3 is a member used to convert the wavelength of the laser light emitted from the semiconductor laser element. The fluorescent member 3 includes the phosphor-containing layer 1, which contains a phosphor adapted to convert the wavelength of the laser beam emitted from the semiconductor laser element, and the light reflecting layer 2, which reflects the light incident on the fluorescent member 3, in this order from a light incidence side. The phosphor-containing layer 1 may be spaced apart from the light reflecting layer 2, but it is preferable that the phosphor-containing layer 1 and the light reflecting layer 2 are in contact with each other so that light wavelength-converted by the phosphor is efficiently extracted.

The fluorescent member 3 is disposed above the heat dissipation member 5 (discussed below), and accordingly, the fluorescent member 3 is preferably includes a bonding region for bonding to the heat dissipation member, outside the region where the optical relaxation member is disposed in a top view.

Phosphor-Containing Layer 1

For the phosphor-containing layer 1, any appropriate phosphor known in this field can be used, for example. More specific examples of the phosphor include cerium-activated yttrium.aluminum.garnet (YAG), cerium-activated lutetium-aluminum.garnet (LAG), europium-activated silicates ((Sr, Ba)$_2$SiO$_4$), and manganese-activated fluoride complex phosphors such as A$_2$MF$_6$:Mn (where A is one or more of Li, Na, K, Rb, Cs, and NH$_4$, and M is one or more of Ge, Si, Sn, Ti, and Zr), such as K$_2$SiF$_6$:Mn (KSF), KSNAF (K$_2$Si$_{1-x}$NaAl$_x$F$_6$:Mn), or K$_2$TiF$_6$:Mn (KTF). These may be used singly or in combinations of two or more. When a nitride semiconductor laser element including the active layer made of a GaN-based material is used for the semiconductor laser element that emits the laser beam with which the fluorescent member 3 is irradiated, a YAG-based phosphor, a LAG-based phosphor, or a SiAlON-based phosphor, which have resistance to laser light, are preferably used for the phosphor-containing layer 1. In this case, white light can be obtained by combining a semiconductor laser element that emits blue light with a YAG-based phosphor.

The phosphor-containing layer 1 may be constituted of only a phosphor, such as in a form of a single crystal or a sintered body of a phosphor, or may be constituted of a phosphor and a holding material for holding the phosphor. The phosphor-containing layer 1 containing a phosphor and a holding material allows for facilitating scattering of laser light in the phosphor-containing layer 1, and thus is suitable for a reflection type in which the light incident surface of the phosphor-containing layer 1 also serves as the light extraction surface. An inorganic material is preferably used for the holding material. This allows for deterioration, discoloration, and the like of the holding material attributable to the light emitted from the semiconductor laser element. Examples of inorganic materials include ceramics such as an alumina, yttria, zirconia, and silica, and glass materials. The phosphor is preferably contained, for example, at an amount of 30 vol % to 100 vol % relative to the phosphor-containing layer 1. When an inorganic material is used for the holding material, the phosphor-containing layer 1 can be made of a ceramic or the like.

The phosphor-containing layer 1 is preferably a plate-shaped member. Also, the phosphor-containing layer 1 preferably has a substantially flat surface, and more preferably has a flat upper surface and a flat lower surface parallel to each other. The expression "substantially flat surface" as used herein may include a surface that is flat when viewed macroscopically and rough when viewed microscopically.

In consideration of handling and heat dissipation, the thickness of the phosphor-containing layer 1 is, for example, preferably in a range of 50 µm to 300 µm, and more preferably 80 µm to 200 µm.

The phosphor-containing layer 1 may partially have varied thicknesses, but preferably has a uniform thickness. The phosphor-containing layer 1 can have any appropriate shape and size. For example, the phosphor-containing layer 1 may have a triangular shape, a polygonal shape (e.g., a quadrangular shape), a circular shape, an elliptical shape, or a combination of two or more of these. In case where the phosphor-containing layer 1 is irradiated with the laser beam having a spot diameter of about 500 µm, for example, the phosphor-containing layer 1 preferably has a size that allows several spots to several dozen spots, and more preferably from several spots to ten spots of laser light to be irradiated to the phosphor-containing layer 1. This allows for increasing tolerance of precision of the irradiation position of the laser beam. More specifically, the size of the phosphor-containing layer 1 is from 2 µm$^2$ to 300 µm$^2$.

The phosphor-containing layer 1 can be formed, for example, using spark plasma sintering (SPS), hot isostatic pressing (HIP), cold isostatic pressing (CIP), or the like.

An antireflective film, a band pass filter, or the like may be disposed, for example, on an upper surface of the phosphor-containing layer 1, that is, a surface on which the laser light is incident. For the antireflection film, an antireflection film having a low reflectance, such as a few percent, to light in the wavelength band of the laser beam and having low reflectance also to light wavelength-converted by the phosphor is preferably used. This allows for reducing loss of light that is incident on and is emitted from the fluorescent member 3. Examples of the material of the antireflective film include $SiO_2$, $Al_2O_3$, $ZrO_2$, $Nb_2O_5$, MgO, and $Ta_2O_5$. Two or more of these materials may be stacked.

Light Reflecting Layer 2

The light reflecting layer 2 preferably has a function of reflecting both employed laser light and light wavelength-converted by the fluorescent member 3. For example, the light reflecting layer 2 preferably has a reflectance of 80% or greater, and more preferably 90% or greater with respect to laser light. The light reflecting layer preferably has a reflectance of 80% or greater, more preferably 90% or greater, with respect to light wavelength-converted by the phosphor. The light reflecting layer 2 is preferably disposed in a form of a layer on a surface of the phosphor-containing layer 1. The light reflecting layer 2 preferably has the same size and shape as the phosphor-containing layer 1, but may be slightly larger than the phosphor-containing layer 1. The light reflecting layer 2 preferably has a thickness that allows for having the reflectance as described above, and preferably has a thickness of, for example, 100 nm or more, and more preferably in a range of 100 nm to 3 µm.

Examples of the light reflecting layer 2 include a single layer or multilayer dielectric film, a single layer or multilayer metal film, and a combination of these. Examples of a dielectric multilayer film include a multilayer film in which an $SiO_2$ film and an $Nb_2O_5$ film are repeatedly layered. The light reflecting layer 2 preferably contains a metal layer so that the light reflecting layer 2 has a relatively high reflectance to light over a wide wavelength band. For example, the light reflecting layer 2 preferably includes a silver layer or an aluminum layer. When a metal layer is disposed directly on the phosphor-containing layer 1, a portion of light may be absorbed by the metal layer. Accordingly, a single layer or multilayer dielectric film may be disposed between the metal layer and the phosphor-containing layer 1. The light reflecting layer 2 may further include a film for improving adhesion to the fluorescent member, a film for preventing metal migration, or the like. Examples of adhesion improving films include films made of Ti and $Al_2O_3$. Examples of films for preventing metal migration include a film made of Pr, Rh, W, Ru or the like.

Optical Relaxation Members 4A or 4B

The optical relaxation members 4A or 4B can absorb and/or diffuse light. For example, as described above, the optical relaxation members 4A or 4B includes the light absorbing member 4a or 4b, the polarization member 4c, a light diffusing member, or a combination of two or more of these members. For these members, any appropriate materials known in the art can be used. Examples of the light absorbing member 4a or 4b include members adapted to absorb laser light, and more specific examples thereof include, when the wavelength of the laser light is in a range of 400 to 470 nm, Au, W, Ti, Ni, Cu, V, Pt or the like, or copper oxide, iron oxide, and chromium oxide. These members preferably have rough surfaces rather than flat surfaces. This allows for changing the polarization direction of the irradiating laser light. Examples of the polarization member 4c include members adapted to transmit or reflect laser light, and more specific examples thereof include, liquid crystal elements, and polarizing plates and polarizing sheets made of metal, resin, and the like.

Examples of the light diffusion member include silicon oxide, titanium oxide, zirconium oxide, magnesium oxide, magnesium carbonate, magnesium hydroxide, calcium carbonate, calcium hydroxide, calcium silicate, zinc oxide, barium titanate, aluminum oxide, iron oxide, chromium oxide, manganese oxide and the like. Also, the light diffusion member may include smooth surfaces and/or rough surfaces so that a space having the desired shape can be at least partially defined by the light diffusion member.

The optical relaxation member may have a shape other than a layer (that is, a single layer or a 1 structure) so long as the optical relaxation member can absorb and/or diffuse the irradiating laser light.

In one embodiment, as shown to FIG. 1A, the optical relaxation member is constituted of only a light absorbing member 4a in layer form. The light absorbing member 4a preferably has an irregular surface, and the irregular surface more preferably has a relatively high roughness (for example, Ra=400 nm or more).

In another embodiment of the optical relaxation member, as shown in FIG. 1B, with a recess having an opening in the upper surface of the heat dissipation member 5 (described below), the optical relaxation member is constituted of the light absorbing member 4b covering the bottom and lateral surfaces along a recessed shape. For example, when the light absorbing member 4b is disposed on the bottom and lateral surfaces of the recess as shown in FIG. 1B, surfaces of the light absorbing member 4b is preferably smooth, and the upward-facing surface of the recess is preferably rougher than the lateral surfaces of the recess so that reflection on the lateral surfaces of the recess can be facilitated.

A region of the heat dissipation member 5 on which the light absorbing member 4b is disposed preferably has a rough surface corresponding to the rough region of the light absorbing member 4b.

For example, in the case where the light absorbing member 4b having a rough surface is disposed on a lateral surface of the heat dissipation member 5, it is preferable that a corresponding one of the lateral surfaces of the heat dissipation member 5 has a rough surface accordingly.

In another embodiment of the optical relaxation member, a combination of the light absorbing member 4a and the polarization member 4c is used for the optical relaxation member. In this structure, the laser light is set to be incident at a predetermined angle with respect to the phosphor-containing layer of the fluorescent module. With this, when the fluorescent member is detached due to damage to the fluorescent module or the like, laser light is incident on the polarization member 4c at a predetermined angle, while a portion of the incident laser light is reflected by the light absorbing member, the heat dissipation member, or the like and returns to the polarization member 4c at an angle different from the predetermined angle, being prevented from passing through the polarization member 4c.

Examples of the optical relaxation member having such a structure include, as shown in FIG. 1C, a layered structure of two or more kinds of member of the light absorbing member 4a and the polarization member 4c in a layer form that are layered such that the polarization member 4c disposed at an emission side of the laser light may be used; and, as shown in FIG. 1D, using the gap in the recess 5a, a structure including the recess-shaped light absorbing member 4b, disposed on the upward-facing surface and lateral surfaces of the recess 5a, and the plate-shaped polarization member 4c disposed on an upper surface of the light absorbing member 4b. The light absorbing member 4a and the polarization member 4c, each of which is in a form of a layer, may be layered or in contact with each other as shown in FIG. 1C, or may be entirely or partially apart from each other as shown in FIG. 1D.

Figure 1E:
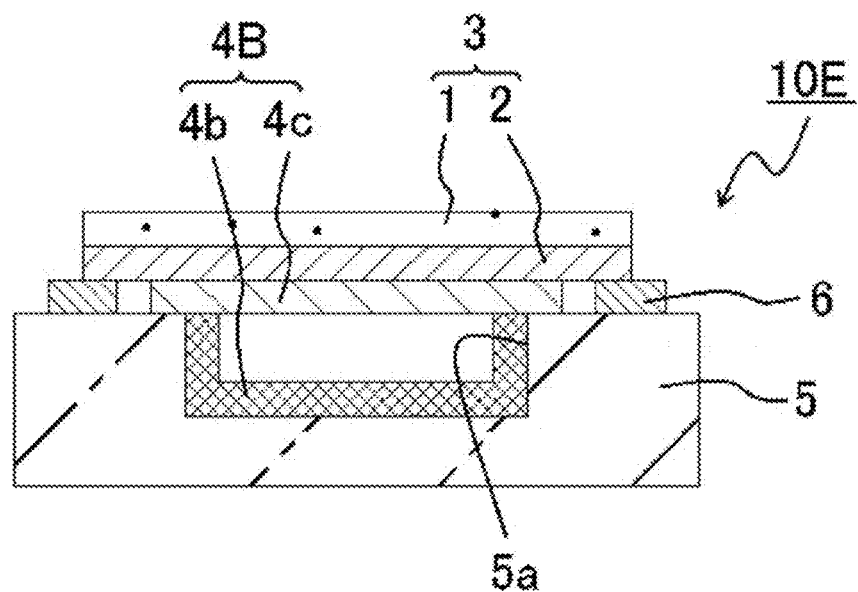
FIG. 1E is a schematic cross-sectional view of a fluorescent module of a modified example of the fluorescent module in FIG. 1D.
Figure 1F:
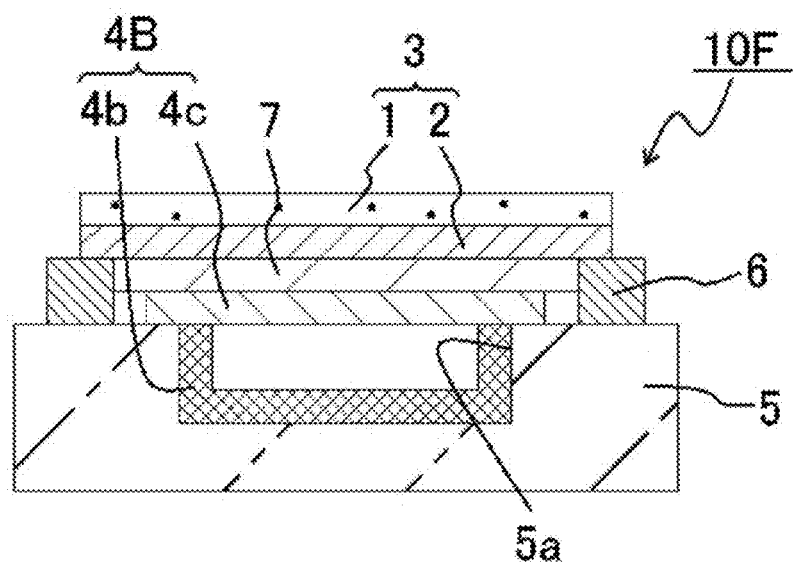
FIG. 1F is a schematic cross-sectional view of a fluorescent module of another modified example of the fluorescent module in FIG. 1D.
Figure 1G:
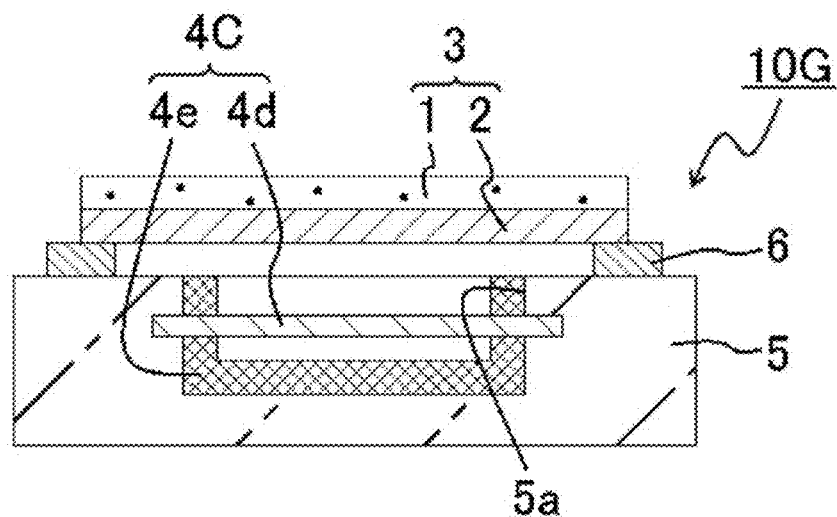
FIG. 1G is a schematic cross-sectional view of a fluorescent module of still another modified example of the fluorescent module in FIG. 1D.

Further, as shown in FIG. 1G, a recess-shaped light absorbing member 4e may be disposed along the bottom and lateral surfaces of the recess in the upper surface of the heat dissipation member, and the polarization member 4d may be disposed laterally penetrating the recess-shaped light absorbing member 4e between an upper end and a lower end of the lateral surfaces of the recess-shaped light absorbing member 4e. Either of the polarization member and the light absorbing member may be disposed on the light irradiation side, but it is preferable that the polarization member is disposed at the light irradiation side. In addition, in the optical relaxation member, it is preferable that the polarization member 4c and the light absorbing member 4a or 4b are entirely or partially spaced apart from each other. It is more preferable that the polarization member is disposed on the light irradiation side, and the members are entirely or partially spaced apart from each other.

It is preferable the light absorbing member 4a or 4b is preferably separated from the polarization member 4c while the light absorbing member 4a or 4b preferably includes both a portion that extends parallel to the polarization member 4c and a portion is inclined at an angle inclined with respect to the polarization member 4c, rather than the light absorbing member 4a or 4b being entirely parallel or substantially parallel to the polarization member 4c.

When the laser light passes through the polarization member 4c and is reflected without being absorbed by the light absorbing member 4a or 4b, with the separation between the polarization member 4c and the light absorbing member 4a or 4b or the gap between the polarization member 4c and the light absorbing member 4a or 4b, the reflected light does not easily pass through the parallel or inclined polarization member 4c, which can increase the optical relaxation effect.

The optical relaxation member 4A or 4B is disposed below the light reflecting layer 2 described above. As shown in FIG. 1E, the optical relaxation member 4A or 4B, and particularly the polarization member 4c, may be entirely or partially in contact with the light reflecting layer 2. As shown in FIG. 1F, the optical relaxation member 4A or 4B, and particularly the polarization member 4c, may be partially or entirely in contact with the light reflecting layer 2 via the light transmission member 7, but are preferably spaced apart from the light reflecting layer 2 so that, when detachment, breakage, or the like of the fluorescent member 3 occurs, such defect does not affect the optical relaxation member. The optical relaxation member 4A or 4B, such as the light absorbing member 4a or 4b and/or the polarization member 4c, may be spaced apart from the heat dissipation member 5, but, for example, it is preferable that the optical relaxation member 4A or 4B is disposed in contact with a surface of the heat dissipation member 5, is partially located below an upper surface of the heat dissipation member 5, or is be entirely located below an upper surface of the heat dissipation member 5 as shown in FIGS. 1A and 1C. When a recess 5a having an opening in the upper surface of the heat dissipation member 5 is defined, it is preferable that the optical relaxation member 4A or 4B is disposed only on the upward-facing surface of the recess 5a, or as shown in FIGS. 1B, 1D, etc., is disposed in contact with an entirety of the upward-facing surface and an entirety of lateral surfaces of the recess 5a.

The thickness of the light absorbing member 4a can be appropriately adjusted according to the material to be used, and may be in a range of 0.4 μm to 500 μm, for example. This allows for absorbing a large amount of laser light and effectively dissipating the heat of the fluorescent member toward the heat dissipation member. The planar shape of the light absorbing member 4a may be, for example, a shape that is substantially the same as the planar shape of the fluorescent member, the phosphor-containing layer, the light reflecting layer, etc., or that can be included in examples of these planar shapes, and is preferably slightly smaller in size than these members or layers.

The polarization member 4c is preferably in the form of a layer. The planar shape of the polarization member 4c may be, for example, a shape that is substantially the same as the planar shape of the fluorescent member, the phosphor-containing layer, the light reflecting layer, etc., or that can be included in examples of these planar shapes, and is preferably slightly smaller in size than these members or layers. For the polarization member 4c, any polarization member that is known in this field and that allows for obtaining p polarization, s polarization, etc., can be used.

Heat Dissipation Member 5

The heat dissipation member 5 is used to dissipate the heat of the fluorescent member 3.

For a material of heat dissipation member 5 having good heat dissipation, a material having a thermal conductivity higher than that of the phosphor is preferably used. This allows for effectively releasing heat generated in the fluorescent member, particularly in the phosphor-containing layer, and allows for improving the emission efficiency of the phosphor. Examples of such materials include metals, ceramics, and combinations thereof. For example, a metal such as Ag, Cu, Al, Au. Rh or the like, an alloy containing one or more of these, an AlN ceramic, or the like may be used.

The heat dissipation member 5 may have any appropriate thickness that allows for ensuring sufficient strength, for example, thickness in a range of 500 μm to 5 mm. The heat dissipation member 5 is preferably has a planar size larger than that of the fluorescent member and the optical relaxation member. This allows for increasing the surface area bonded with other members and increasing the heat capacity of heat dissipation member 5, so the heat of the phosphor can be efficiently dissipated. Also, the upper surface of heat dissipation member 5 may be flat, or may be a rough surface, and the recess 5a may be disposed on the upper surface of heat dissipation member 5. The recess has a depth in a range of 100 μm to 2000 μm, for example.

Figure 1H:
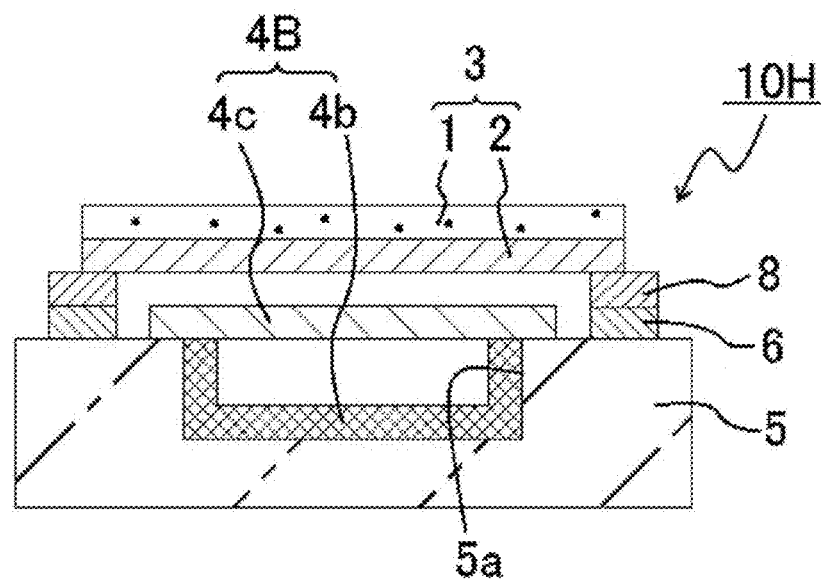
FIG. 1H is a schematic cross-sectional view of a fluorescent module of even another modified example of the fluorescent module in FIG. 1D.
Figure 1I:
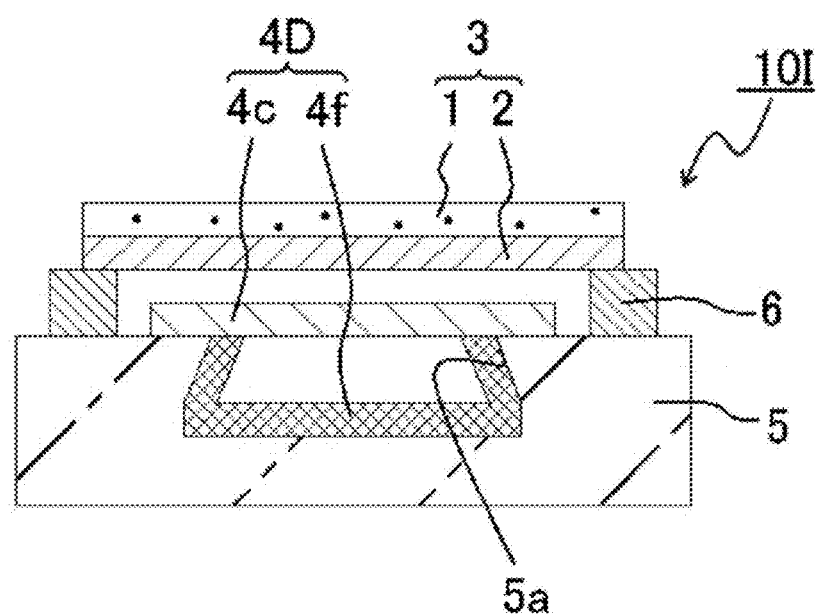
FIG. 1I is a schematic cross-sectional view of a fluorescent module of yet another modified example of the fluorescent module in FIG. 1D.

As shown in FIG. 1B, etc., the recess 5a may have lateral surfaces that are substantially perpendicular to the upper surface or the fluorescent member 3, or as shown in FIG. 1I, the lateral surfaces may narrow toward the top, for example. With such a shape, the amount of laser light that reaches under the recess and is then emitted from the recess-shaped opening by reflection can be further reduced.

It is preferable that the fluorescent member, optical relaxation member, etc., are secured to the heat dissipation member 5 using, for example, a bonding member. Examples of the bonding member include solders such as tin-bismuth based solders, tin-copper based solders, tin-silver based solders, gold-tin based solders; alloys whose main components are gold and tin, alloys whose main components are gold and germanium, and eutectic alloys of two or more of these alloys; conductive pastes of silver, gold, or the like; brazing materials of low-melting point metals; and composite adhesives that are a combination of two or more of these. In particular, it is preferable that an entirety or a portion of the fluorescent member 3 is disposed on the heat dissipating member 5, and the fluorescent member 3 is secured on the heat dissipating member 5 other than a region of the fluorescent member 3 irradiated with laser light, such as an outer peripheral portion of the fluorescent member 3, via the bonding member 6 as shown in FIG. 1A, etc., or a layered member in which the bonding member 6 and a sub-mount 8 are layered as shown in FIG. 1H, which serve as the bonding member 6. When using a layered member in which the bonding member 6 and the sub-mount 8 are layered, either one of these may be disposed on the fluorescent member side. Such securing allows for ensuring a dissipation path for the heat generated by the fluorescent member 3.

Light Transmissive Member 7

The fluorescent module may further include a light transmissive member 7. For example, the light transmissive member 7 may be disposed between the fluorescent member 3 and the optical relaxation member 4B as shown in FIG. 1F so as to increase resistance to damage when the phosphor-containing layer 1 is subjected to an external impact. Alternatively, the light transmissive member 7 may be disposed on the upper surface of the phosphor-containing layer 1. For example, the light transmissive member 7 preferably transmits 70% or more, and more preferably transmits 80% or more of laser light irradiated to the light transmissive member 7. Examples of the light transmissive member 7 include inorganic glass, sapphire, quartz, and resin. Of these, sapphire having relatively high thermal conductivity is preferably used, which allows heat generated by the fluorescent member 3 to be dissipated by the light transmissive member 7, so that the emission efficiency of the phosphor in the fluorescent member 3 can be improved.

Fifth Embodiment: Illumination Device 20

Figure 2:
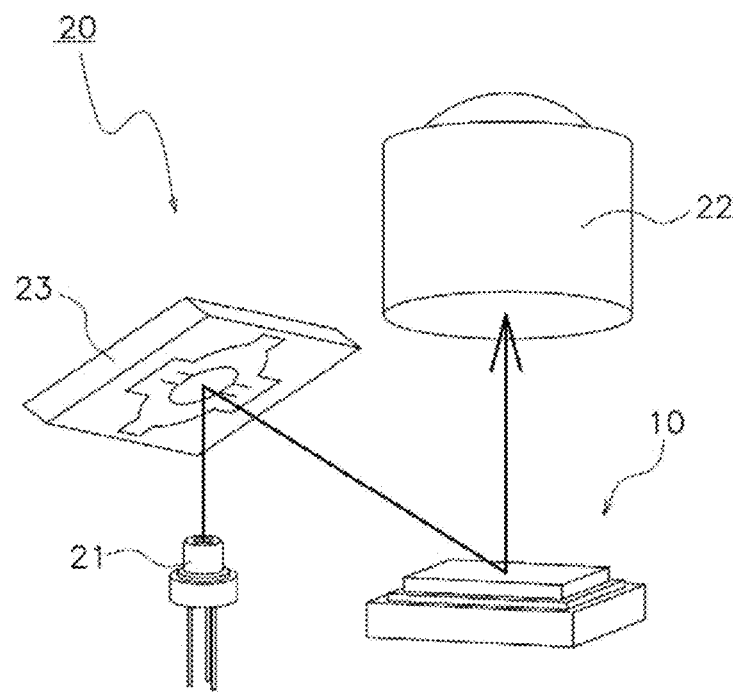
FIG. 2 is a schematic diagram of an illumination device according to a fifth embodiment of the present disclosure.

As shown in FIG. 2, the illumination device 20 according to a fifth embodiment includes a laser device 21 that emits laser light, and the fluorescent module 10 described above.

For the laser device 21, a laser device in which a light emitting element is housed in a package known in this field, or a light emitting element may be used. The light emitting element and the fluorescent module 10 are disposed such that laser light emitted from the light emitting element in the laser device 21 is incident on the phosphor-containing layer of the fluorescent module 10. Also, the optical relaxation member in the fluorescent module 10 is disposed at the position where the laser beam emitted to the fluorescent module is assumed to be incident on the assumption that fluorescent member does not include the fluorescent module. In other words, the light emitting element and the fluorescent module are disposed such that the laser light emitted from the light emitting element is incident on the fluorescent module, and that the optical relaxation member is disposed frontward of the direction in which the laser light is incident on the fluorescent member, via the phosphor-containing layer and the light reflecting layer.

With the illumination device 20, the light emitted from the fluorescent module 10 can be emitted to the outside through an optical member 22 adapted to convert light distribution or the like of light emitted from the fluorescent module 10 to the desired light distribution or the like. Also, as described above, a spatial light modulator 23 may be provided between the laser device 21 and the fluorescent module 10 so that the oscillation direction of the waves of the emitted laser light is incident at a predetermined angle.

With a such configuration, when no defect occurs in the fluorescent member, substantially an entirety of laser light is incident on the fluorescent member as designed. A portion of the laser light incident on the fluorescent member is wavelength-converted and reflected or diffused by the phosphor of the phosphor-containing layer, and travels to the outside or is reflected by the light reflecting layer and then travels to the outside. Another portion of the laser light incident on the fluorescent member is reflected by the light reflecting layer and travels to the outside without wavelength-converted by the phosphor. The wavelength-converted light and the light that has not been wavelength-converted are mixed, so that, for example, white light is obtained and is emitted to the outside. On the other hand, even if the fluorescent member is detached, broken, or the like, the optical relaxation member disposed below the fluorescent member can effectively absorb or reduce the laser light irradiated to the fluorescent member, and laser light that would otherwise be released or leak to the outside due to reflection can be effectively reduced. Therefore, in illumination device applications such as automotive headlights, or projectors, for example, if breakage of the fluorescent member occurs due to vibration, external impact, or the like, and in particular laser light is not irradiated to the phosphor-containing layer, the optical relaxation member can absorb or reduce laser light, so that direct viewing of the laser light due to reflection can be prevented.

For example, when the illumination device has the fluorescent module 10A shown in FIG. 1A, even if the fluorescent member, particularly the phosphor-containing layer is detached, broken, or the like, the light absorbing member 4a disposed below the fluorescent member can effectively absorb or reduce laser light irradiated to the fluorescent member, so that laser light that would otherwise be released or leak to the outside due to reflection can be effectively reduced.

When the illumination device has the fluorescent module 10B shown in FIG. 1B, even if the fluorescent member, and particularly the phosphor-containing layer is detached, broken, or the like, the laser light irradiating the fluorescent member can reach the recess 5a. With the light absorbing member 4b disposed on the bottom and lateral surfaces of the recess 5a, most of the laser light that reaches the recess 5a is absorbed. This allows for effectively reducing laser light that would otherwise be released or leaks to the outside by reflection.

When the illumination device includes the fluorescent module 10C shown in FIG. 1C, even if the fluorescent member, and particularly the phosphor-containing layer is detached, broken, or the like, the laser light irradiated to the fluorescent member passes through the polarization member 4c and reach the light absorbing member 4a, where a large portion of the laser light is absorbed. A portion of laser light that is not absorbed by the light absorbing member is reflected by the heat dissipation member 5 and absorbed by the light absorbing member 4b. This allows for effectively reducing laser light that would otherwise be released or leak to the outside due to reflection.

When the illumination device includes the fluorescent module 10D shown in FIG. 1D, the laser light is adjusted to be incident at a predetermined angle with respect to the phosphor-containing layer of the fluorescent module, and the polarization member 4c is preferably adjusted such that the polarization member 4c does not transmit light at an angle different from an angle at which the laser light emitted toward the fluorescent module is incident on the polarization member 4c when the fluorescent member is not disposed in the fluorescent module. In other words, the laser light is preferably adjusted to be incident at a predetermined angle with respect to the phosphor-containing layer of the fluorescent module, and more preferably adjusted such that the reflectance of the specular reflection is close to zero. For example, the laser light is even more preferably adjusted to be the Brewster's angle with respect to the incident surface of the phosphor-containing layer.

With a such configuration, even if the fluorescent member 3, such as the phosphor-containing layer 1 and/or the light reflecting layer 2, is detached, broken, or the like and is fell off from a predetermined position, allowing laser light to pass through the polarization member 4c and to reach the recess 5a, a large portion of laser light is absorbed by the light absorbing member 4b disposed on the upward-facing surface and the lateral surfaces of the recess 5a. On the other hand, a portion of laser light that is not absorbed by the light absorbing member 4b is reflected and absorbed by the light absorbing member 4b. Also, a portion of laser light reaching the polarization member 4c again has a polarization direction that has been changed due to diffusion and reflected, and does not pass through the polarization member 4c and return to the inside of the recess 5a, in which the laser light is absorbed by the light absorbing member 4b disposed on the bottom and lateral surfaces thereof. This allows for more effectively reducing laser light that would otherwise be released or leak to the outside due to reflection.

Light Emitting Element

A light emitting element is used for the light source of the illumination device. The laser light emitted from the light emitting element has a peak emission wavelength in a range of, for example, 400 nm to 470 nm. The area of the laser light spot is, for example, preferably 1 $mm^2$ or less, and more preferably 0.5 $mm^2$ or less, on the surface of the fluorescent member in top view. The laser light spot has an area of, for example, 0.007 $mm^2$ or greater. In top view, the size of the laser light spot may be, for example, 0.1 mm or more in width. The term "width" as used herein refers to the diameter when the laser light spot has a substantially circular shape, and refers to the major diameter (the length of the major axis) when the laser light spot has a substantially elliptical shape. The laser light spot can be adjusted using an optical member such as a lens or a fiber.

The light emitting element is preferably hermetically sealed by a package, which allows for reducing dust collection caused by the laser light emitted from the light emitting element.

In this illumination device, a single light emitting element may be used, or a plurality of light emitting elements may be used. When using the plurality of light emitting elements, for example, a plurality of laser beams emitted from a plurality of light emitting elements is preferably condensed into a single beam. This allows high-density laser light to be extracted, and allows high luminance to be obtained. The light emitting elements may have the same wavelength, or may have different wavelengths.

The light emitting element emits laser light having a peak wavelength in the range of 430 nm to 470 nm, for example. Laser light of such a wavelength band is suitable for excitation of a YAG-based phosphor. Examples of a light emitting element that emits laser light of such a wavelength band include a GaN-based semiconductor laser element.

The phosphor contained in the phosphor-containing layer 1 is not limited to those described above, and a combination of a plurality of kinds of YAG-based phosphors may be used for the phosphor contained in the phosphor-containing layer 1. Hereinafter, a combination of a plurality of types of phosphor will be referred to as a "mixed phosphor." In more specific example, a mixed phosphor containing a YAG phosphor and a Ga-YAG phosphor may be contained in the same layer and used in the phosphor-containing layer 1. In this specification, the term "Ga-YAG phosphor" refers to a phosphor in which a portion of the aluminum constituting the YAG phosphor is substituted with gallium.

The oscillation wavelength of a semiconductor laser may vary to some extent at the time of manufacture. Accordingly, when a semiconductor laser that emits blue laser light is combined with a YAG phosphor to obtain white light, white light obtained from the excitation light emitted from the semiconductor laser and the fluorescent light emitted from the YAG phosphor may have chromaticity varied among a plurality of light emitting devices. That is, variation in chromaticity may occur due to variations in the excitation light. Using the mixed phosphor described above makes allows for reducing variation in chromaticity among a plurality of light emitting devices.

Using a mixed phosphor allows for reducing variation in chromaticity of white light obtained from excitation light and the fluorescent light emitted from the mixed phosphor, as compared to the case of singly using a YAG phosphor for the phosphor-containing layer 1. The peak wavelength of the excitation light is preferably selected from a wavelength range including the peak wavelengths of the various excitation spectrums so as to efficiently excite the YAG phosphor and the Ga-YAG phosphor. For example, it is preferable for the peak wavelength of the laser light emitted from the laser device to be in the range of 440 nm to 460 nm. With the peak wavelength in this range, the mixed phosphor can be excited in a relatively high range of peak intensity of the excitation spectrum, so that the decrease in emission intensity can be prevented. Also, it is preferable for the peak wavelength of the laser light emitted from the laser device to be in the range where the intensity of the excitation spectrum of the YAG phosphor and the Ga-YAG phosphor is 85% or more. The phosphor-containing layer 1 preferably includes only a mixed phosphor as the phosphor, that is, only a YAG phosphor and a Ga-YAG phosphor in order to reduce the variation in chromaticity. The effect of reducing the chromaticity difference of such a mixed phosphor can be obtained without light reflecting layer, optical relaxation member, or a heat dissipation member. Further, the phosphor-containing layer 1 may be formed of a mixed phosphor and a holding material for holding the mixed phosphor. In this case, the phosphor-containing layer 1 is a phosphor plate in which the YAG phosphor and the Ga-YAG phosphor are contained in the same layer, and the volumetric ratio of the Ga-YAG phosphor to the whole of the YAG phosphor and the Ga-YAG phosphor is in a range of 19.0% to 78.5%, more preferably in a range of 19.0% to 80%, and still more preferably in a range of 60% to 80%.

The mixing ratio of the YAG phosphor and the Ga-YAG phosphor will be described with reference to FIGS. 3A and 3B.

Figure 3A:
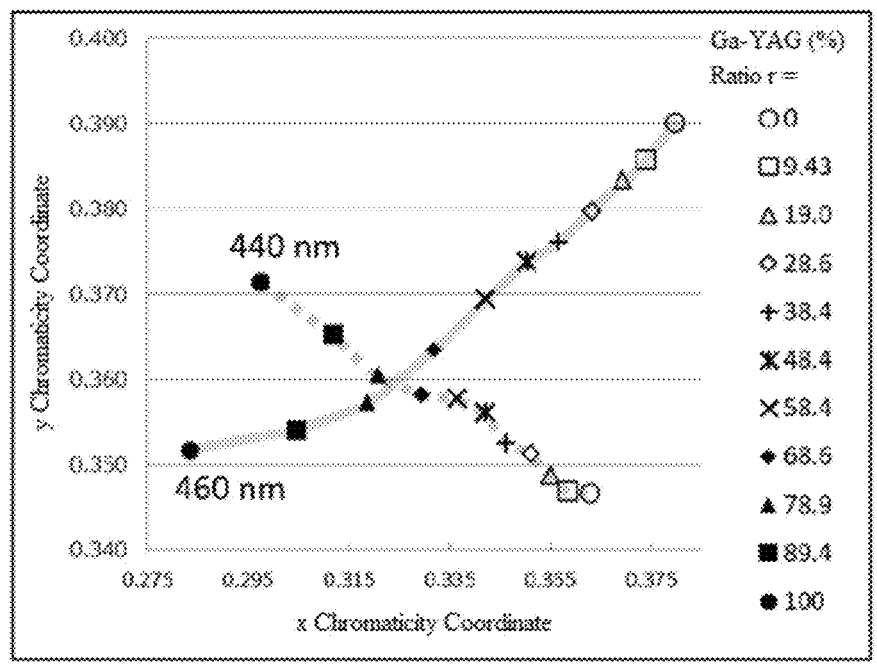
FIG. 3A is chromaticity coordinates of white light obtained by blue laser light and a fluorescence emitted from a phosphor when the peak wavelength of the blue laser light is 440 nm and 460 nm.

FIG. 3A is a graph in which the chromaticity of the white light obtained by the fluorescence emitted from the excitation light and the mixed phosphor when a mixed phosphor, in which the volumetric ratio r of Ga-YAG phosphor to the total of YAG phosphor and Ga-YAG phosphor is sequentially varied, is plotted on chromaticity coordinates. The composition of the YAG phosphor used in this experiment was $Y_{2.90}Ce_{0.10}Al_5O_{12}$, and the composition of the Ga-YAG was $Y_{2.94}Ce_{0.06}Al_{3.5}Ga_{1.5}O_{12}$. The average particle size was 10 μm for both. The peak wavelength of the YAG phosphor emission spectrum was 562 nm, and the peak wavelength of the Ga-YAG phosphor was 531 nm. The gray broken line in FIG. 3A connects the chromaticity coordinates when the excitation wavelength is 440 nm, and the gray solid line connects the chromaticity coordinates when the excitation wavelength is 460 nm.

Figure 3B:
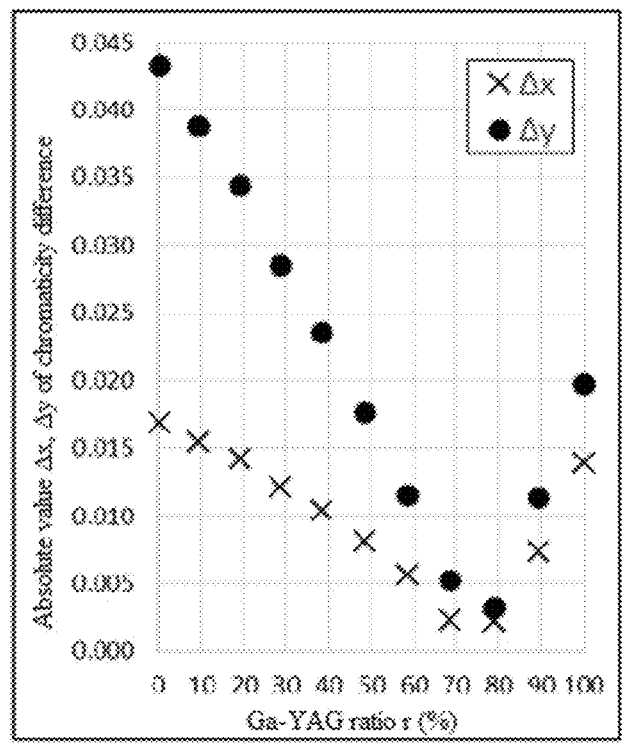
FIG. 3B is a graph showing the absolute values of the amount of change in x chromaticity coordinates and y chromaticity coordinates for each mixture volume ratio from the results in FIG. 3A.

FIG. 3B is a graph in which the absolute value of the amount of change in x chromaticity coordinate and the absolute value of the amount of change in y chromaticity coordinate are obtained from FIG. 3A and plotted for each mixing ratio.

The value of r is preferably in the range of r=19.0 to 78.5. As shown in FIG. 3A, when r=9.43, the lower limit value of the y chromaticity coordinate remains almost unchanged as compared with the result when r=0. On the other hand, when r=19.0, the lower limit value of the y chromaticity coordinate can be larger than when r=0 or 9.43. Therefore, r=19.0 or more is preferable. Further, r=60 or more is still more preferable. Also, from FIG. 3A and FIG. 3B, when r=78.9, the x chromaticity coordinate and the y chromaticity coordinate are both at their minimum within the range of the obtained experimental results, without greatly changing the color, as compared with the YAG phosphor alone. Therefore, r=80 or less is preferable. Further, r=78.9 or less is more preferable. The preferred value of r for further reducing the chromaticity difference is r=58.5 to 78.5, more preferably r=60 to 80. When r=58.4, i.e., 60, the absolute value of the amount of change in the y chromaticity coordinate is almost the same as the result when r=89.4, but the absolute value of the amount of change in the x chromaticity coordinate is smaller than that.

Also, the ratio of the mixing amount can be varied according to a purpose. The chromaticity difference can also be reduced within the white range defined by international standards for automobiles, such as the ECE standard.

The volumetric ratio of the YAG phosphor and the Ga-YAG phosphor in the phosphor-containing layer may be determined by calculating the cross-sectional surface area ratio of the two from a cross section of the phosphor-containing layer. The cross-sectional surface area ratio thus obtained is taken as the volumetric ratio of YAG phosphor and Ga-YAG phosphor. For example, there is a method for examining the surface area ratio by performing element mapping using energy dispersive X-ray analysis (EDX) of a cross section or an electron probe micro-analyzer (EPMA).

Reduction in variation of chromaticity is thought to occur as described below.

First, the case of using a single phosphor will be described. In this case, as compared to when the peak wavelength of the excitation light is the same as the peak wavelength of the excitation spectrum of the phosphor, the emission intensity decreases when the peak wavelength of the excitation light differs from the peak wavelength of the excitation spectrum of the phosphor, so that variation in chromaticity occur.

Next, the case of using a mixed phosphor containing two or more types of phosphors having similar emission colors will be described. More specifically, a YAG phosphor and a Ga-YAG phosphor will be used as an example. When the excitation light is incident on the mixed phosphor, the YAG phosphor and the Ga-YAG phosphor both emit light, and a spectrum in which the emission spectra of these phosphors are superimposed is obtained as the emission spectrum of the mixed phosphor. In this case, even when there is variance in the peak wavelength of the excitation light among a plurality of light emitting devices, the variation in emission intensity of the mixed phosphor will be smaller due to compensation of one of the phosphors for the other phosphor, in contrast to when a single phosphor is used. Accordingly, it is considered that variation in chromaticity of the obtained white light can reduced.

Based on discussion above, even if the wavelength of the excitation light varies among a plurality of light emitting devices, it is assumed that the use of a mixed phosphor will reduce chromaticity deviation in the resulting white light, as compared to when using a single phosphor.

An example in which the mixed phosphor consisted of a YAG phosphor and a Ga-YAG phosphor was given above, but a combination of other phosphor may be used. The phosphors that can be combined may be selected from among those with which the respective phosphors can be excited at the peak wavelength of each excitation light, and whose emission color is close.

As shown in FIG. 3A, the chromaticity difference that occurs when a mixed phosphor is excited with semiconductor lasers having peak wavelengths of 440 nm and 460 nm is reduced by mixing a Ga-YAG phosphor with a YAG phosphor within the volumetric ratio range given above, but in addition, the difference between the peak wavelength of the phosphors to be combined here and the peak wavelength of the emission spectrum of the YAG phosphor may be 60 nm or less, and preferably 40 nm or less. Here, as compared to when a single phosphor is used, the variation in the emission intensity of the mixed phosphor is reduced since one phosphor easily compensates for the other. It is considered that variation in chromaticity difference can be more effectively reduced when the peak wavelength difference of the emission spectrum is in the above-mentioned range.

Also, the size of the light reflecting layer 2 may be made smaller than that of the phosphor-containing layer 1 so that it does not protruded outward of the outer periphery of the phosphor-containing layer 1 in top view of the fluorescent module. In case where the light reflecting layer 2 has a plate shape, the short sides and long sides of the light reflecting layer may be shortened.

Figure 4:
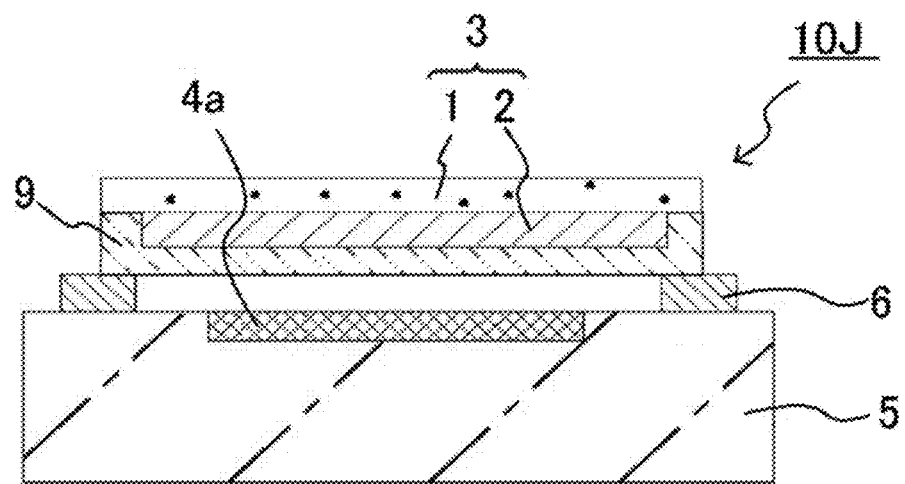
FIG. 4 is a schematic cross-sectional view showing a modified example of the fluorescent module in FIG. 1D.

In case where the size of the light reflecting layer 2 is smaller than the size of the phosphor-containing layer 1, as shown in FIG. 4, the light reflecting layer 2 of a fluorescent module 10J is covered with the phosphor-containing layer 1 and a protective layer 9. This decreases the possibility that gas, salt water, and so on, that can cause contamination or corrosion of the light reflecting layer 2 will reach the light reflecting layer 2, so deterioration of the light reflecting layer 2 can be reduced. In particular, such a structure is preferably used when a material which is easily deteriorated, such as Ag or Al, is used for the light reflecting layer 2.

Metal or the like can be used for the protective layer 9. Examples of the metal used for the protective layer 9 include Ti, Ni, Cu, Ta, W, Pt, Au and the like. More specific examples of the protective layer 9 include a single-layer film of Ti. Ti has a high adhering strength to Al. Moreover, a layered structure two or more of these may be used, or a ceramic material, a resin, or the like may be used.

The wavelength conversion member and the illumination device of the present invention can be used in various applications, such as various automotive light sources (including headlights), light sources for projector devices, backlight sources for liquid crystal displays, and various kinds of illumination device.

According to the present disclosure, it is possible to provide a fluorescent module and an illumination device with which laser light emitted to the outside can be reduced even if detachment, breakage, or the like of the phosphor-containing member occurs.

What is claimed is:
1. A fluorescent module comprising:
   a fluorescent member including
      a phosphor-containing layer, and
      a light reflecting layer disposed on the phosphor-containing layer;
   a heat dissipation member; and
   an optical relaxation member configured to absorb and/or diffuse light, wherein
   the phosphor-containing layer contains a YAG phosphor and a Ga-YAG phosphor within the same layer, the Ga-YAG phosphor being a phosphor in which a portion of the aluminum constituting the YAG phosphor is substituted with gallium,
   a volumetric ratio of the Ga-YAG phosphor to the entirety of the YAG phosphor and the Ga-YAG phosphor is in a range of 19.0% to 80%,
   the optical relaxation member is in contact with the heat dissipation member, and
   the fluorescent member is disposed above the heat dissipation member, and has a bonding region for bonding the fluorescent member to the heat dissipation member, the bonding region being arranged outside a region where the optical relaxation member is disposed in a top view.

2. The fluorescent module according to claim 1, wherein the volumetric ratio of the Ga-YAG phosphor to the entirety of the YAG phosphor and the Ga-YAG phosphor is in a range of 60% to 80%.

3. The fluorescent module according to claim 1, wherein the fluorescent member is secured to the heat dissipation member so that the light reflecting layer is arranged between the phosphor-contacting layer and the heat dissipation member
the optical relaxation member is arranged with respect to the fluorescent member so that the light reflecting layer is arranged between the phosphor-containing layer and the optical relaxation member.

4. The fluorescent module according to claim 1, further comprising:
   a heat dissipation member to which the fluorescent member is secured so that the phosphor-containing layer, the light reflecting layer and the heat dissipation member being arranged in this order starting from a side of the phosphor-containing layer along a first direction normal to the phosphor-containing layer; and
   an optical relaxation member configured to absorb and/or diffuse light, the optical relaxation member being arranged with respect to the fluorescent member so that the phosphor-containing layer, the light reflecting layer and the optical relaxation member being arranged in this order starting from the side of the phosphor-containing layer along the first direction.

5. The fluorescent module according to claim 1, wherein the optical relaxation member includes a light absorbing member configured to absorb light.

6. The fluorescent module according to claim 1, wherein the heat dissipation member defines a recess in an upper surface thereof, and
the optical relaxation member includes a polarization member disposed above the recess.

7. The fluorescent module according to claim 6, wherein the polarization member is in contact with the light reflecting layer.

8. The fluorescent module according to claim 1, wherein the heat dissipation member defines a recess in an upper surface thereof, and
the optical relaxation member includes a light absorbing member arranged in the recess and configured to absorb light.

9. The fluorescent module according to claim 8, wherein the optical relaxation member further includes a polarization member disposed above the recess.

10. The fluorescent module according to claim 8, wherein the optical relaxation member further includes a polarization member laterally penetrating the light absorbing member between an upper end and a lower end of lateral surfaces of the light absorbing member arranged in the recess.

11. The fluorescent module according to claim 8, wherein the light absorbing member covers a lateral surface and a bottom surface of the recess,
the light absorbing member and the polarization member defines a hollow space in the recess.

12. The fluorescent module according to claim 3, further comprising
a submount disposed between the fluorescent member and the heat dissipation member and bonding the fluorescent member and the heat dissipation member.

13. The fluorescent module according to claim 3, further comprising
   a light transmissive member arranged between the fluorescent member and the optical relaxation member.

14. The fluorescent module according to claim 1, wherein the fluorescent member further includes a protective layer covering a part of the light reflecting layer.

15. An illumination device comprising:
   the fluorescent module of claim 1; and
   a laser device configured to emit a laser beam,
   wherein the fluorescent module and the laser device are arranged so that the laser beam is incident on the phosphor-containing layer of the fluorescent module, and the optical relaxation member is disposed at a position on an extension of an optical path of the laser beam incident on the phosphor-containing layer of the fluorescent module.

16. The illumination device according to claim 15, wherein
   in the fluorescent module,
      the heat dissipation member defines a recess in an upper surface thereof, and
      the optical relaxation member has a polarization member disposed above the recess, and
   the fluorescent module and the laser device are arranged so that the laser light incident at a predetermined angle with respect to the phosphor-containing layer of the fluorescent module, and the polarization member is configured so as not to transmit light incident at an angle different from the predetermined angle.

17. The illumination device according to claim 16, wherein
   the predetermined angle is the Brewster's angle with respect to an incident surface of the phosphor-containing layer.

\* \* \* \* \*